Patented Nov. 26, 1935

2,022,229

UNITED STATES PATENT OFFICE 2,022,229

EMULSION AND PROCESS FOR PRODUCING THE SAME

Ulric B. Bray, Palos Verdes Estates, and Lawton B. Beckwith, San Pedro, Calif., assignors to Union Oil Company of California, Los Angeles, Calif., a corporation of California No Drawing. Application March 30, 1934, Serial No. 718,212

14 Claims. (Cl. 134—1)

The present invention relates to improved aqueous emulsions of bitumen, or asphalt, pitch, tar and tar-like substances, resins and other bituminous substances of natural or artificial origin and to a process for making the same. Such emulsions are suitably employed as binders, adhesives and coating compositions and are more particularly employed in road building by the cold laying process, or by the so-called "penetration method" which consists essentially in spraying, pouring, or pumping the asphalt emulsion upon the mineral aggregate on the road bed. Roads are also built by pre-mixing the emulsion with the aggregate and then spreading the mixture on the road bed, which is followed by tamping and rolling; or the emulsion may be blade mixed with the aggregate in place, i. e. on the road bed.

In the production of bituminous emulsions, it is generally recognized that it is desirable to obtain a fine particle size for the emulsified bitumen or asphalt in order to obtain a permanent dispersion of the asphalt which will neither settle nor cream upon standing as well as to obtain satisfactory viscosities for the emulsion. The emulsion must be sufficiently stable to resist disruption during transportation and storage.

It is an object of the present invention to produce an aqueous bituminous emulsion having a fine particle size and a high degree of stability against settling or creaming in storage. Another object of the invention resides in emulsifying melted asphalt with a dilute aqueous solution of alkali, such as caustic soda, having a proper concentration of caustic soda to permit a fine dispersion of the asphalt in the caustic soda solution.

Another object of the invention is to produce a sufficiently stable emulsion to permit pre-mixing with aggregate without rapid breaking.

Another object of the invention resides in the addition of a stabilizer to a primary asphaltic emulsion which is produced by emulsifying melted asphalt with alkaline water or other emulsifying agents, and it is an important object of the invention to cool the primary emulsion prior to the addition of the stabilizer. It is another object of our invention to add an organic type stabilizer to the cooled primary emulsion.

Various other objects and advantages of the invention will become apparent to those skilled in the art from the following description of the preferred manner of compounding the preferred composition which is given herein for the purpose of illustrating and explaining the invention and which is not to be considered as limiting.

Heretofore, it has been proposed to produce bituminous emulsions for use in road laying and for other commercial purposes by heating the bituminous substance such as asphalt, to a temperature above its melting point and then adding a small proportion of a saponifiable material, such as for example, a fatty acid, resin or resin oil. The mixture of melted asphalt and saponifiable material is then agitated with an aqueous solution of alkali, such as for example, caustic soda or potash or sodium or potassium carbonate.

Another method for producing aqueous bituminous emulsions comprises melting the asphalt and then agitating the melted asphalt with a dilute aqueous alkaline solution. In this process the addition of a fatty acid or resin or resin oil to the asphalt or to the aqueous caustic solution is omitted. Emulsification proceeds by the saponification of the natural saponifiable materials in the asphalt itself. Such emulsions if properly prepared may be of the quick breaking type, that is, the emulsion will break rapidly when spread upon a surface. However, when it is desired to increase the stability of the emulsion and/or its permanency, a small amount of soap is added to the emulsion. This will cause the emulsion to break more slowly and thus will permit mixing with mineral aggregate. This method of producing asphalt emulsions is commonly employed at the present time. The present invention relates to an improvement in the production of aqueous bituminous emulsions of the hereinabove mentioned type.

We have discovered that aqueous bituminous emulsions having a fine particle size may be obtained by emulsifying the melted asphalt with an aqueous solution of an alkali, having a proper concentration of alkali such as for example, caustic soda. We have found that when an aqueous solution of caustic soda having a concentration of approximately 0.08 to 0.18% by weight of caustic soda based upon the finished emulsion is employed that an extremely fine dispersion of the asphalt is obtained. By the operation of this process wherein the concentration of caustic soda is carefully regulated, we have obtained emulsions having fine particle size in the neighborhood of 1 to 2 microns. We do not know the exact reason for this phenomenon but we do know that when the concentration of caustic soda in the aqueous solution is not within the above carefully defined limits that either the asphalt will not emulsify, or if it does emulsify, the asphalt is not finely dispersed in the emulsion and thus its stability is greatly reduced. We, therefore, propose to produce asphaltic emulsions by carefully controlling the concentration of the caustic soda in the aqueous solution of caustic soda as indicated above.

We have discovered further that if, after making a fine dispersion of the melted asphalt with an aqueous solution of caustic soda alone as the emulsifying agent, i. e. the primary or quick breaking emulsion, it is desired to make a slow breaking type emulsion by the further addition of a stabilizing agent, it is first necessary to cool the primary emulsion preparatory to the addition of the stabilizing agent, particularly when adding an organic type stabilizer, a number of which will hereinafter be described. We have discovered that when the emulsion is maintained at an elevated temperature for an appreciable length of time subsequent to the addition of the stabilizer there is a deleterious effect upon the efficiency of the stabilizer. The emulsion will not have the degree of permanency or stability as when the emulsion is cooled immediately following the addition of the stabilizer or when the primary emulsion, i. e. the emulsion as produced by emulsification with caustic soda alone is cooled prior to the addition of the stabilizer. In other words, the emulsion produced by the addition of the stabilizer to the primary asphalt emulsion while still hot and allowed to remain hot for a considerable length of time is less stable against mixing with finely divided or unclean aggregates containing calcium or other salts.

In general, the cooling step may be accomplished by circulating the emulsion as produced by emulsification of the asphalt with caustic soda alone, i. e. the primary emulsion, through conventional type cooling coils by means of a suitable pump until the temperature is reduced to approximately 85 to 95° F. Then a suitable quantity of stabilizing agent is added to the cooled emulsion.

An alternative method for producing an emulsion containing a stabilizer comprises in adding a suitable quantity of the stabilizing agent to the hot primary emulsion and then cool the mixture rapidly to a low temperature before any opportunity is given for the heat to exert a deleterious effect upon the efficiency of the stabilizer. One method for accomplishing this is to provide a metering device at a point just prior to the entrance of the hot primary emulsion into the cooling coils and adding regulated quantities of the stabilizer at this point to the hot primary emulsion. The hot primary emulsion containing the stabilizer is then passed through the cooling coils wherein it is cooled to an appropriate temperature as indicated above. Other methods for accomplishing this result will be apparent to those skilled in the art. However, we prefer to cool the emulsion as produced by emulsification of the asphalt with caustic soda alone before mixing in the stabilizer since it may require considerable time to cool the hot emulsion containing the stabilizer and thus it is possible that the emulsion may be maintained at an elevated temperature for a length of time sufficient to exert a deleterious effect upon the efficiency of the stabilizer.

As specific examples of the stabilizer which may be used according to the foregoing disclosure to give excellent results there are a large number of protein type materials which can be added to the cooled primary emulsion. As specific protein materials we have successfully used casein, glue and blood albumen. We have also successfully used such carbohydrate stabilizers as starch, gum acacia, agar agar, algin, mucilage forming gums such as tragacanth, pectin, Irish moss, or other substances known as pentosans which upon hydrolysis gives five-carbon-atom sugars.

In some instances it may be desirable to add to the emulsion a preservative for the stabilizer in order to prevent fermentation or other decomposition. Such preservatives include formaldehyde, cresol, phenol, sodium benzoate and the like.

The following is a specific example of carrying out our invention:

A primary fine grained emulsion is first produced by emulsification with caustic soda alone by heating approximately 60% to 62% by weight of asphalt produced from Poso Creek residuum and having a penetration at 77° F. of 220, (A. S. T. M. Method D-5-25) to a temperature of approximately 320° F. after which the melted asphalt is passed through a mixing device comprising a centrifugal pump by means of which an aqueous solution of sodium hydroxide only containing approximately 0.30 to 0.35% by weight of sodium hydroxide is intimately mixed with the melted asphalt. This will give an alkali content of about 0.12 to 0.14% sodium hydroxide in the emulsion at this point. Agitation by circulating the emulsion through the mixing devices is continued until the asphalt is finely dispersed in the caustic soda solution. The emulsion as produced by the aforesaid process comprises one containing a fine particle size and is of the quick breaking type. It may be passed to storage and used as a quick breaking emulsion without further treatment or addition of stabilizers.

However, in order to make a slow breaking type emulsion of the quick breaking emulsion, the hot primary emulsion is cooled to the temperature of approximately 85 to 95° F. by circulating the hot primary emulsion through usual cooling coils. When the primary emulsion has been cooled to the appropriate temperature, a small amount of casein is mixed into the primary emulsion. The casein is preferably incorporated into the emulsion as a solution of sodium caseinate which has been prepared by mixing with thorough agitation 20% by weight of casein with the proper amount of cold water and then allowing it to digest in the cold with agitation for a period of one to two hours and then adding 1% by weight of sodium hydroxide with additional agitation. The addition of the caustic soda to the heavy casein slurry should cause appreciable liquefaction and homogenization. The casein solution thus prepared is injected into the cooled emulsion as the latter material is being circulated in and out of the emulsifying tank through the centrifugal pump. The point of injection is preferably ahead of the centrifugal pump. The addition of the casein solution is gaged rather closely to obtain 1% casein on the diluted or finished emulsion, although from 0.5 to 2.0% by weight of the stabilizer may be incorporated into the emulsion. Instead of using sodium caseinate as a stabilizing agent we may add any of the stabilizers mentioned above.

After the thorough incorporation of the casein into the emulsion, a preservative, preferably formaldehyde, is incorporated into the emulsion. Commercial 40% formaldehyde solution or formalin, is used in the proportion of 0.1% by weight of the 40% formaldehyde solution based on the finished emulsion. The formalin is diluted about 20 to 1 with water before injecting into the circulating stream of emulsion.

After the proper amount of the casein solution and formalin have been added to the batch, the calculated asphalt content is reduced to 56%, or the residue upon evaporation to 57%, by the addition of water. The emulsion is then ready for storage.

It will be observed that caution should be exercised at all times to prevent the emulsion from being heated to temperatures above 95 to 100° F. after the addition of the casein, nor will it be necessary to ever heat the emulsion to above such temperatures since the emulsion will have a sufficiently low viscosity to flow under all conditions and no difficulties will be encountered from plugged spray nozzles when using this type of emulsion which is extremely stable under practically all conditions, provided the temperature has been kept down.

Instead of employing sodium hydroxide as the emulsifying agent for the melted asphalt to produce the primary emulsion, we may employ other alkaline materials such as potassium hydroxide, sodium or potassium carbonate and the like; or we may emulsify the asphalt with a soap solution containing such soaps as sodium or potassium oleate, sodium or potassium resinate, sodium or potassium stearate, sodium or potassium palmitate, or soaps of fish oil and coconut oil; or if desired, we may form the primary emulsion with a mixture of an alkali and an alkaloid, pyridine, piccolin or chinolin bases.

When using such neutral or slightly alkaline soaps as sodium oleate or sodium resinate as emulsifying agents to produce the primary dispersion, it has been found that a rough emulsion is produced. In order to obtain an extremely fine particle size, it is preferable to pass the rough emulsion produced by emulsifying the melted asphalt with such soaps through a colloid mill. This will reduce the particle size to an extremely fine sub-division. The colloid milled emulsion is then cooled and the stabilizer such as casein is then incorporated with thorough agitation.

We have also discovered that very finely dispersed asphalt emulsions of quick breaking characteristics which may later be cooled and stabilized by the addition of stabilizers can be obtained by emulsifying the melted asphalt with certain alkaline salts or salts of weak acids such as sodium borate or sodium carbonate or salt of certain weak organic acids such as sodium phenate and sodium cresolate. When using such salts to produce the primary emulsion, approximately 0.5% by weight based upon the finished emulsion of the alkaline salt is employed. After cooling the emulsion to approximately 85 to 95° F. a stabilizer such as casein is incorporated into the emulsion. In case the primary emulsion is produced by sodium phenate or sodium cresolate as the emulsifying agent, it has been found that no preservative is needed for the organic stabilizer due to the preservative action of the phenol and cresol. Otherwise, it is desirable to add a preservative such as formaldehyde to emulsions stabilized with organic materials.

The foregoing exemplary description of our invention is not to be considered as limiting since many variations may be made within the scope of the following claims by those skilled in the art without departing from the spirit thereof.

We claim:

1. A process for producing aqueous bituminous emulsions of the slow breaking type which comprises melting bitumen, commingling said melted bitumen with an aqueous solution containing an emulsifying agent to produce an emulsion of the quick breaking type, cooling said emulsion to a temperature below approximately 100° F. to produce a cooled flowable emulsion and subsequently commingling said cooled emulsion with a small amount of a stabilizing agent selected from the class consisting of proteins and carbohydrates whose stabilizing effect is lessened when commingled with said quick breaking emulsion at elevated temperatures necessary to effect emulsification of said bitumen with said aqueous solution containing the emulsifying agent, said cooling of said quick breaking emulsion being to a sufficiently low temperature so that the effect of said stabilizing agent is not materially lessened when commingled with said quick breaking emulsion.

2. A process as in claim 1 in which the quick breaking emulsion is cooled to a temperature of approximately 100° F. before adding the stabilizing agent.

3. A process as in claim 1 in which said emulsifying agent is an aqueous solution containing caustic alkali in an amount and concentration sufficient to produce said emulsion of the quick breaking type.

4. A process for producing aqueous bituminous emulsions of the slow breaking type which comprises melting bitumen, commingling said melted bitumen with an aqueous alkaline solution containing an amount of caustic alkali sufficient to produce an emulsion of the quick breaking type, cooling said emulsion to a temperature below approximately 100° F. to produce a cooled flowable emulsion and commingling said cooled emulsion with a small amount of a stabilizing agent selected from the class consisting of proteins and carbohydrates whose stabilizing effect is lessened when commingled with said quick breaking emulsion at elevated temperature necessary to effect emulsification of said bitumen with said aqueous alkaline solution and subsequently adding a preservative to the emulsion to prevent fermentation of said stabilizing agent.

5. A process as in claim 4 in which the quick breaking emulsion is cooled to a temperature of approximately 85 to 95° F. before adding the stabilizing agent.

6. A process as in claim 1 in which the quick breaking emulsion is cooled to approximately 85 to 95° F. before adding the stabilizing agent.

7. A process as in claim 1 in which the stabilizing agent is a carbohydrate.

8. A process as in claim 1 in which the stabilizing agent is a protein.

9. A process as in claim 1 in which the stabilizing agent is casein.

10. A process as in claim 1 in which the emulsifying agent is sodium hydroxide in an amount between 0.08 to 0.18% by weight based upon the finished emulsion.

11. A process according to claim 4 in which the preservative is selected from a group consisting of formaldehyde, cresol, phenol and sodium benzoate.

12. A process as in claim 1 in which the stabilizing agent is starch.

13. A process as in claim 1 in which the stabilizing agent is a mucilage forming gum.

14. A process as in claim 1 in which the stabilizing agent is gum tragacanth.

ULRIC B. BRAY.
LAWTON B. BECKWITH.